(12) United States Patent
Sandi-Tapia et al.

(10) Patent No.: US 7,077,983 B2
(45) Date of Patent: Jul. 18, 2006

(54) POLYMER NANOCOMPOSITES FOR LITHIUM BATTERY APPLICATIONS

(75) Inventors: Giselle Sandi-Tapia, Glen Ellyn, IL (US); Kathleen Carrado Gregar, Naperville, IL (US)

(73) Assignee: University of Chicago, Chicago, IL (US)

( * ) Notice: Subject to any disclaimer, the term of this patent is extended or adjusted under 35 U.S.C. 154(b) by 477 days.

(21) Appl. No.: 10/334,880

(22) Filed: Dec. 31, 2002

(65) Prior Publication Data

US 2004/0126667 A1    Jul. 1, 2004

(51) Int. Cl.
*H01M 10/40*   (2006.01)
*C08J 5/22*    (2006.01)

(52) U.S. Cl. .................. 252/511; 252/518.1; 429/302; 429/307; 429/304; 429/317; 429/33

(58) Field of Classification Search ............... 252/511, 252/518.1; 429/302, 304, 33, 317
See application file for complete search history.

(56) References Cited

U.S. PATENT DOCUMENTS

| 4,077,938 | A | * | 3/1978 | Daimon et al. | ............. 523/203 |
| 5,308,808 | A |   | 5/1994 | Gregar et al. | |
| 5,891,611 | A | * | 4/1999 | Majumdar et al. | .......... 430/529 |
| 6,544,689 | B1 | * | 4/2003 | Riley et al. | ................. 429/302 |

FOREIGN PATENT DOCUMENTS

BE    EP 887101 A1 *  6/1998

OTHER PUBLICATIONS

Hitzky et al, "Polymer-Salt Intercalation Complexes in Layer Silicates," Adv. Matl. 1990, 2(11), pp. 545-547.*
Schmidt et al, "Dispersion and Nucleating Effects of Clay Fillers in Nanocomposite Polymer films," Abstract, ACS Symposium Series, Jul. 2000-Dec. 1, 2001.*
Lemmon et al, "Preparation of Nanocomposites containing Poly(ethylene oxide) and Layered Solids," Electrochimica Acta, 1995, 40 (13-14), pp. 2245-2249.*
Lemmon, J.P.; Wu, J, Oriakhi, C., Lerner, M. Electrochem. Acta., 1995, 40, 2245, Preparation of Nanocomposites Containing Poly(ethylene oxide) and Layered Solids.
Vaia, R.A.; Jandt, K.D. Kramer; E.J. Giannellis, E.P. Kinetics of Poly Melt Intercalation, Macromolecules, 1995, 28, 8080.
Tunney, J.J.; Detellier, C. Chem. Mater., 1996, 8 , 927, Aluminosilicate Nanocomposite Materials, Poly(ehtylene glycol)—Kaolinite Intercalates, Ottawa-Carleton Chemistry Institute, 1996 American Chemical Society.
Eduardo Ruiz-Hitzsky and Pilar Aranda, Adv. Mater 2 (1990) No. 11, Polymer-Sat Intercalation Complexes in Layer Silicates.

* cited by examiner

*Primary Examiner*—Mark Kopec
*Assistant Examiner*—Kallambella Vijayakumar
(74) *Attorney, Agent, or Firm*—Emrich & Dithmar LLC

(57) ABSTRACT

A single ion-conducting nanocomposite of a substantially amorphous polyethylene ether and a negatively charged synthetic smectite clay useful as an electrolyte. Excess $SiO_2$ improves conductivity and when combined with synthetic hectorite forms superior membranes for batteries. A method of making membranes is also disclosed.

20 Claims, 13 Drawing Sheets

POLYMER NANOCOMPOSITES FOR LITHIUM BATTERY APPLICATIONS

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

BACKGROUND OF THE INVENTION

Lithium ion secondary batteries are currently the best portable energy storage device for the consumer electronics market. Improved safety over conventional, fully liquid electrolytes provides a compelling rationale for use of polymer electrolytes in rechargeable lithium batteries, but these polymers often show insufficient conductivity or poor mechanical properties The dual ion-conducting nature of most polymer electrolytes also poses problems. Investigations of the transport properties indicate that cationic transference numbers are non-unity or even negative, indicating substantial transport by anionic complexes, particularly at high salt concentration. Concentration gradients caused by the mobility of both cations and anions in the electrolyte arise during cell operation, resulting in premature cell failure. This is a more severe problem than in conventional liquid electrolytes because of the lower salt diffusion coefficients and the relative immobility of the polymer hosts.

Attempts to design single ion conductors based on polymer-electrolytes with fixed negative charges on the polymer have met with limited success; conductivities are relatively too low for practical use. Still, the ease of film fabrication, ability to withstand electrode volume changes, and low temperature operation of a well-designed polymer-based system provide distinct advantages over many ceramic single-ion conductors.

The conductivities of lithium-containing polymer-clay nanocomposites are greatly enhanced over synthetic polymer single-ion conductors because only cations are mobile in these materials. Preparation is simpler, they are self-supporting, and generally have excellent mechanical properties.

The modification of polymer properties by the addition of another material, that is, a filler, has been studied for many years. Common fillers such as glass fibers, carbon fibers and carbon black, pigments and minerals, including silicates, have been used to modify the macroscopic properties of the polymer, such as modulus and toughness. In recent years, a new class of materials have been developed by dispersing layered silicates with polymers at the nanoscale level. These new materials have attracted wide interest because they often exhibit chemical and physical characteristics that are very different from the starting material. In some cases, the silicates and polymers exist as alternating layers of inorganic and organic, as disclosed in Lemmon, J. P.; Wu, J.; Oriakhi, C.; Lerner, M. *Electrochim. Acta.,* 1995, 40, 2245; Vaia, R. A.; Jandt, K. D.; Kramer, E. J.; Giannelis, E. P.; *Macromolecules,* 1995, 28, 8080; and Tunney, J. J.; Detellier, C. *Chem. Mater.,* 1996, 8, 927. The possibility of improved mechanical, rheological, electrical, and optical properties and the ability to exercise control over existing physical and chemical behavior have led to a large number of studies of these materials, including composites of layer silicate clays with polyethylene oxide (PEO), epoxy resin, polystyrene, and a range of other thermoplastics and elastomers.

Polymer electrolytes exhibit high conductivity only in the absence of a crystalline phase, which impedes the transport of ions, and only at temperatures well above the glass-transition temperature ($T_g$). A number of methods have been used to prepare totally amorphous polymers of high conductivity, including random copolymers or branched block copolymers. However, the mechanical strength of these polymers is often poor because of their low transition temperatures. Mechanical strength can be maintained by crosslinking of the polymer chains, but this comes at the expense of reduced conductivity. Another approach to increasing conductivity is to incorporate low molecular weight plasticizers into the polymer.

Nanocomposite materials of PEO and phyllosilicates were first suggested by Ruiz-Hitzky and Aranda, Ruiz-Hitzky, E.; Aranda, P. *Adv. Mater.,* 1990, 2, 545, as candidates for polymer electrolytes. Within these materials, the polymer chains are intercalated between the silicate layers. The polymer chains then provide a mobile matrix in which cations are able to move. Nanocomposites of PEO and montmorillonite form a layered aluminosilicate clay. When this composite contains $LiBF_4$, it displays conductivities up to 2 orders of magnitude larger than that of PEO itself at ambient temperatures. However, the addition of lithium salts, which is needed to obtain such conductivity values, is not desirable for two reasons; the first one relates to a more complicated synthetic route and the second relates to the fact that transference numbers are not unity since in this case both cations and anions move.

SUMMARY OF THE INVENTION

An important object of the present invention is to provide an improved electrolyte for a lithium ion secondary battery.

Another object of the present invention to provide a single ion-conducting material of a substantially amorphous polyethylene ether and a negatively charged synthetic smectite clay.

Another object of the present invention is to provide a single ion-conducting polymer electrolyte in which a substantially amorphous polyethylene ether is intercalated in a synthetic phyllosilicate clay having excess silicon dioxide distributed therein wherein the transference numbers are greater than 0.9.

Yet another object of the present invention is to provide a lithium ion conducting polymer electrolyte in which polyethylene oxide is intercalated in phyllosilicate clay forming platelets having thicknesses in the 15–40 nanometer range.

Still another object of the present invention is to provide a both individual cells and battery of an alkali metal containing cathode and an anode separated by an electrolyte membrane of the type hereinbefore set forth.

A final object of the present invention is to provide a method of making a single ion-conducting material in which a single ion-conducting material is formed by providing a single ion-conducting solid electrolyte, providing and mixing negatively charged synthetic smectite clay and a polyethylene ether to intercalate the polyethylene ether in the clay, heating the mixture beyond the glass transition temperature of the clay and cooling.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENT

Figure 1:
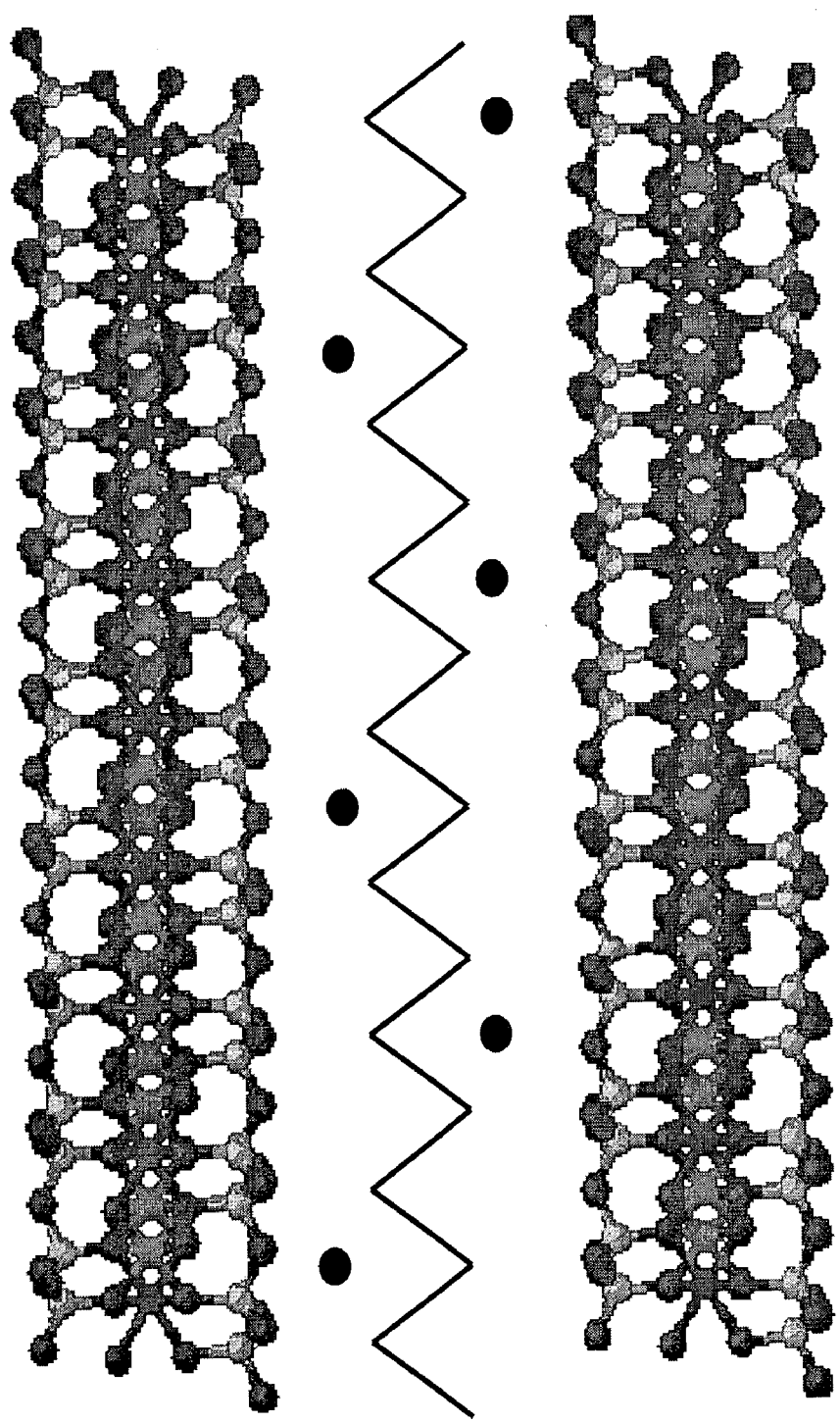
FIG. 1 is a schematic illustration of intercalated polyethylene oxide in a synthetic lithium smectite.

We have prepared a series of nanocomposites containing PEO intercalated in the layers of hectorite clays. These clays, also called phyllosilicates, belong to the family of smectite clay minerals. They are composed of two tetrahedral silicate layers sandwiching a central octahedral layer in a so-called 2:1 arrangement, see FIG. 1. In hectorite, isomorphous substitutions in the lattice of Li(I) for Mg(II) in the octahedral layers cause an overall negative charge that is compensated by the presence of interlayer, or gallery, cations. Interlayer water is present and the cations are easily exchangeable. A large degree of preferential orientation in films prepared with natural occurring clays tends to occur, however, due to their large platelet size (up to 1 μm). This can lead to non-conducting planes being perpendicular to the current path and thus reduce the conductivity. In the present invention, the prior art problems were avoided by employing the method developed by Carrado et al. in U.S. Pat. No. 5,308,808, the entire disclosure of which is incorporated herein by reference, which involves direct hydrothermal synthesis and crystallization of hectorite with smaller platelet size, termed synthetic lithium hectorite (SLH). Organic molecules can be either incorporated directly from the gel or by subsequent intercalation. FIG. 1 shows a schematic structure of intercalated PEO in a SLH. The circles in the gallery represent Li ions.

Even though there has been a considerable amount of experimental work related to the synthesis of nanocomposite films derived from PEO and montmorillonite, a naturally occurring clay, using a melt intercalation procedure, as electrolytes, their conductivity is low. The use of polyethylene ethers, such as PEO and synthetic smectite clays such as SLH and TEOS, a new synthetic hectorite made from the tetraethoxysilane precursor, see The Use of Organo and Alkoxysilanes in the Synthesis of Grafted And Pristine Clays, K. A. Carrado, L. Xu, R. Csencsits, J. V. Muntean, *Chemistry of Materials*, 2001, 13, 3766–3773, the entire disclosure of which is incorporated by reference, is new and has provided unexpectedly superior results as compared to the combination of natural clays and PEO. To the best of our knowledge, PEO/SLH or PEO/TEOS nanocomposites have not been used as polymer electrolytes and surprisingly result in materials in which only the cation, preferably Li ions, move through the electrolyte, and, therefore, the inventive materials are properly described as single ion-conducting electrolytes.

Preparation of the SLH or TEOS clays via hydrothermal crystallization at 100° C. of silica sol, magnesium hydroxide, and lithium fluoride can be found in detail in the incorporated '808 patent to Carrado et al. In brief, precursor clay gels are of the composition: 1.32 LiF, 5.3 Mg(OH)$_2$, 8 SiO$_2$, n H$_2$O, to correlate with the ideal hectorite composition of Li$_{0.66}$[Li$_{0.66}$Mg$_{5.34}$Si$_8$O$_{20}$(OH,F)$_4$]. A typical reaction begins by suspending the LiF with stirring in water. Separately, MgCl$_2$.0.6H$_2$O is dissolved in water and mixed with 2 N NH$_4$OH to crystallize fresh Mg(OH)$_2$. Prior to use, this brucite source must be washed several times with water to remove excess ions. It is then added wet to the LiF solution. This slurry is stirred for 15–30 min before addition of silica sol (Iudox HS-30, Na$^+$-stabilized, 30%). More or less silica sol may be added depending on the amount of excess SiO$_2$ desired in the final product. The total volume is increased to afford a 2 wt % solids suspension, and is stirred and refluxed for 40–48 hours. Solids are isolated by centrifugation, washed, and air-dried.

Colloidal suspensions of 1 g SLH/100 ml de-ionized water were stirred for one-half hour. The desired amount of PEO (100,000 average molecular weight, from Aldrich) was then added, and the mixture stirred for 24 hours. Mixtures contained 0.6, 0.8, 1.0, and 1.2 g of PEO/g of clay. Films were prepared by puddle-casting the slurries onto Tefloncoated glass plates and air-drying. Further drying was carried out at 120° C. under an inert atmosphere for at least 48 hours. The typical thickness of the films is about 40 μm. For comparative purposes, films of PEO/laponite were prepared as disclosed in Doeff, M.; Reed, J. S. *Solid State Ionics*, 1998, 113–115, 109.

X-ray powder diffraction (XRD) patterns of SLH and PEO powders were determined using a Rigaku Miniflex, with Cu K$_\alpha$ radiation and a NaI detector at a scan rate of 0.5° 2Θ/min and step size of 0.05.

In situ small angle x-ray scattering (SAXS) was carried out at the Advanced Photon Source, (Basic Energy Sciences Synchrotron Research Center CAT), Argonne National Laboratory. The SAXS intensity of the investigated material I(q) is the function of the angle of scattering (2Θ) and the wavelength (λ) of the applied radiation. This relation can be expressed as q=4π sin θ/λ. Monochromatic X-rays (18 keV) are scattered off the sample and collected on a 15×15 cm$^2$ CCD camera. The scattered intensity is corrected for absorption and instrument background. The differential scattering cross section is expressed as a function of the scattering vector q. The value of q is proportional to the inverse of the length scale ($Å^{-1}$). The instrument was operated with a sample-to-detector distance of 332 mm to obtain data at $0.1 < q < 3.0$ $Å^{-1}$.

Figure 2:
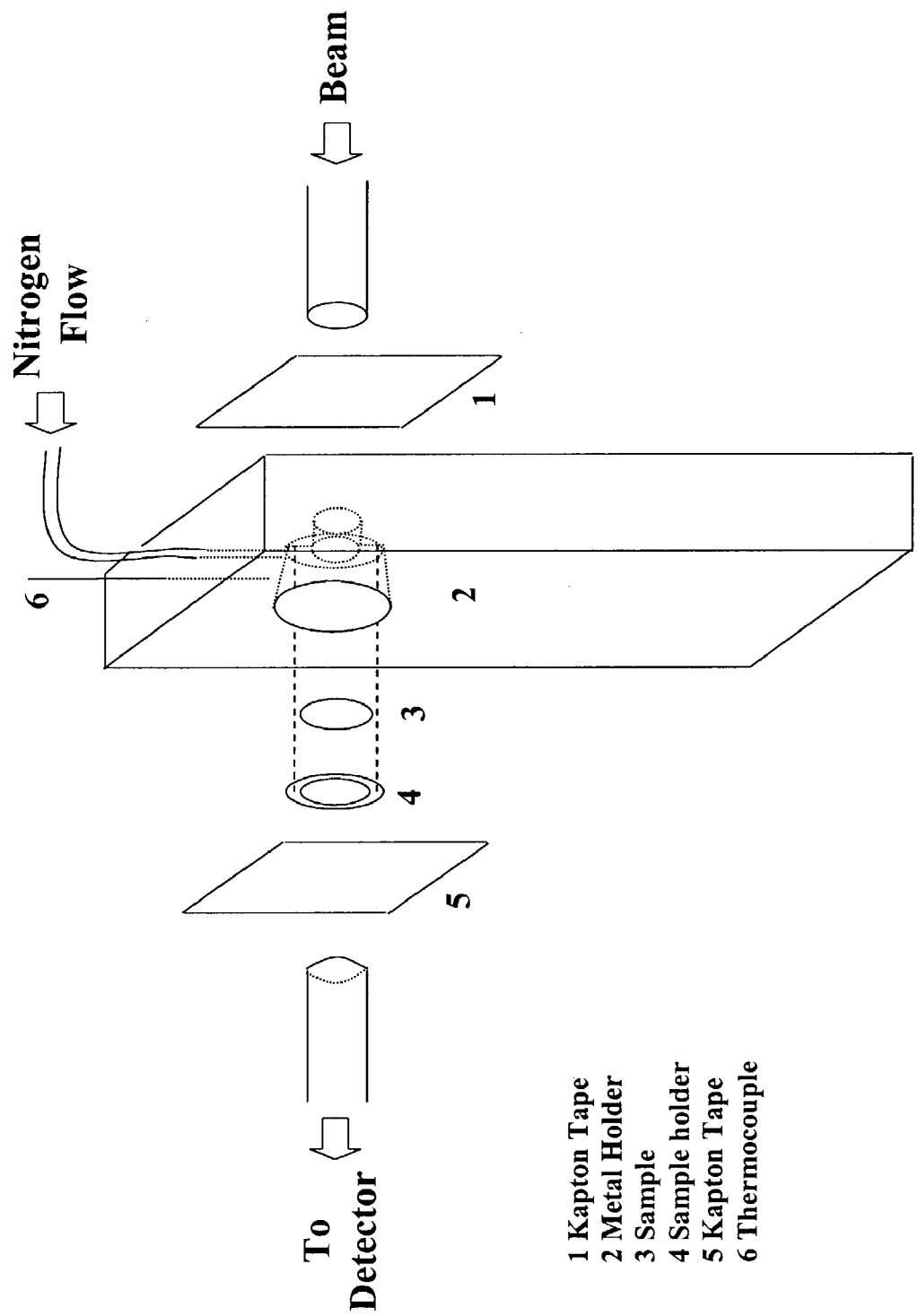
FIG. 2 is a schematic representation of the sample holder used to obtain the small angle x-ray scattering (SAxS) data.

For these examples, a specially designed sample holder was used to heat up the sample and collect SAXS data at the same time. FIG. 2 shows a diagram of the sample holder. Films of about 1.25 cm in diameter and 40 μm in thickness were placed in the sample holder and held using kapton tape. The furnace temperature program was set to ramp from room temperature to 150° C. at 5° C./min, and the gas flow of nitrogen was started at room temperature. Temperature readings have an error of ±5° C. SAXS data were collected at room temperature, 60, 80, 100, 120, and 150° C. in order to compare the structural results with the conductivity values. The sample holder with a piece of kapton tape heated at each temperature was used as the blank and all the SAXS data were corrected accordingly.

AC impedance measurements as a function of temperature were obtained on films in sealed cells with lithium foil as the counter and working electrode, using a Solartron SI 1256 electrochemical interface and 1254 frequency response analyzer. A Tenney Junior Environmental Test Chamber was used to controlled the temperature of the cell with a precision of ±0.5° C.

Transmission electron microscopy (TEM) was performed in a JEOL 100CXII Transmission Electron Microscope operating at 100 kV. Approximately 0.2 mL of a 1:1 PEO/SLH slurry was placed into a vial and sonicated for 30 seconds. Copper grids were then dipped into the resulting slurry. The Cu grids were allowed to dry for 2 hours in a vacuum oven at 100° C. Once dry, the grids were inserted into non-tilt holders and loaded into the instrument. Scale markers placed on the micrographs are accurate to within three percent.

Understanding the structural changes of the PEO component in the nanocomposite films upon heating is crucial for predicting the conductivity of these materials. In situ SAXS is an excellent technique for deriving such information because of this particular instrument's time-resolving capability and its high flux.

Figure 3:
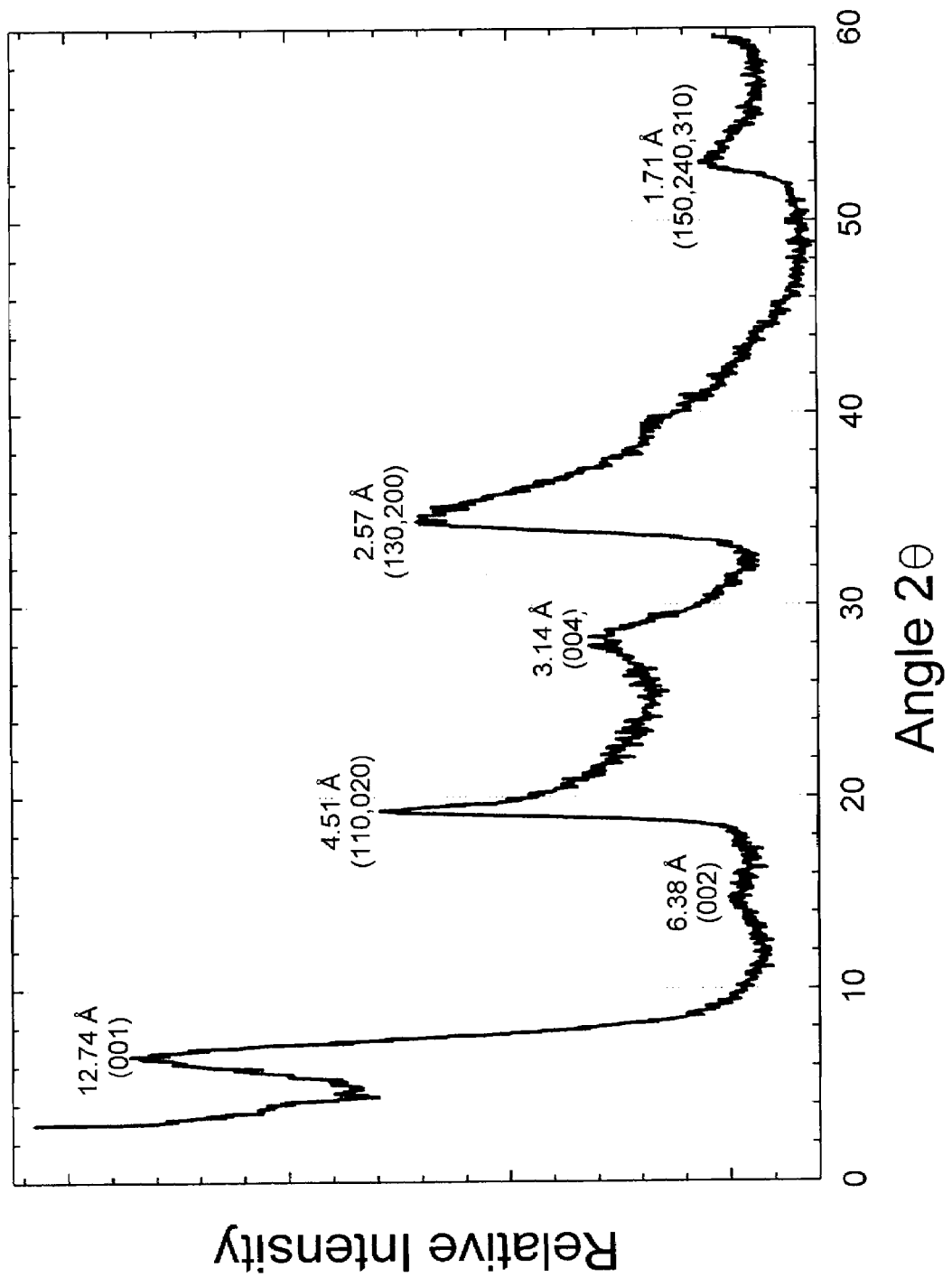
FIG. 3 is an x-ray powder diffraction of the synthetic lithium smectite powder with the inset showing major diffraction peaks.
Figure 4:
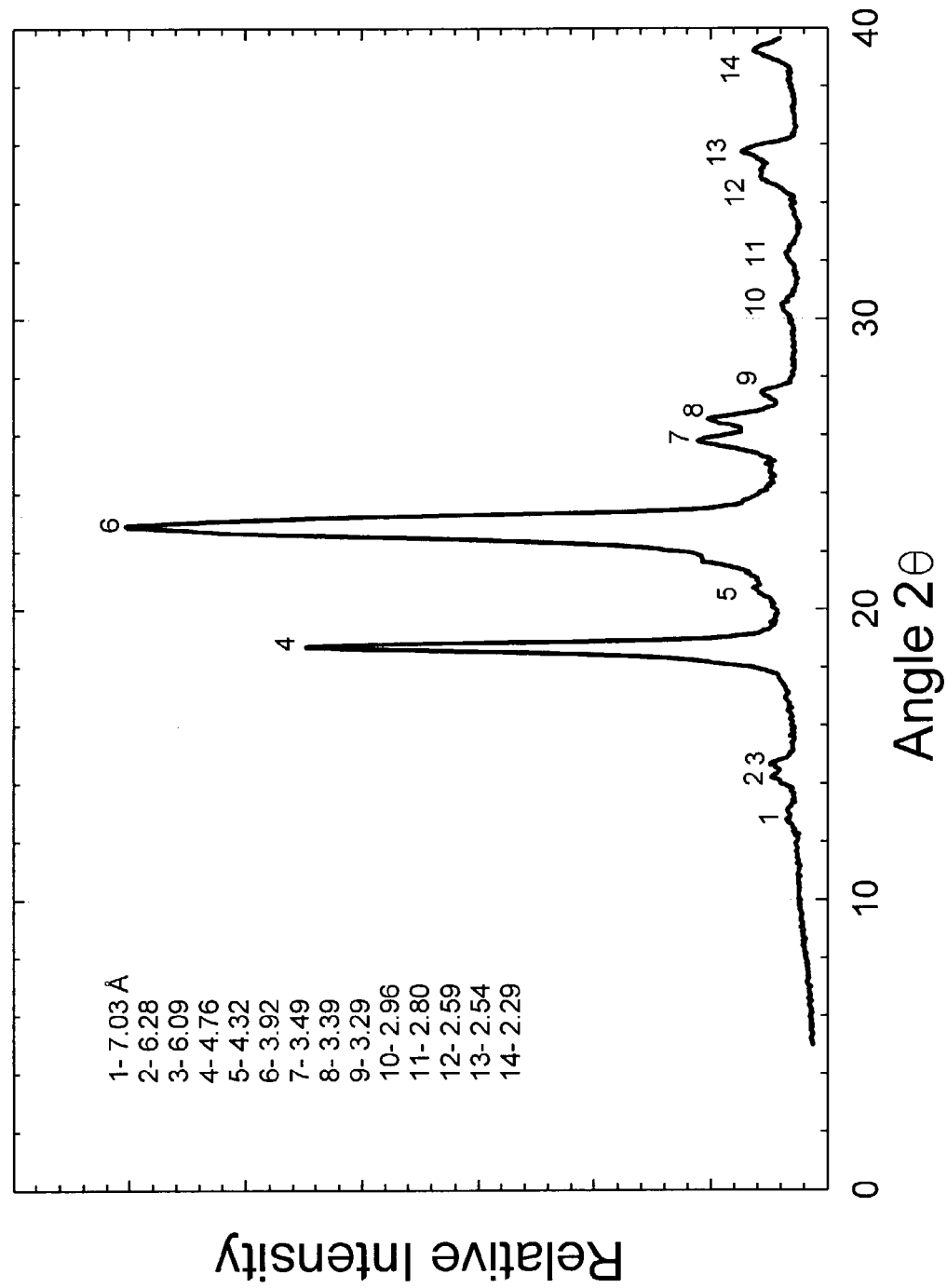
FIG. 4 is an x-ray powder diffraction pattern of the polyethylene oxide powder used to make the films of the present invention with the inset showing major diffraction peaks.
Figure 5:
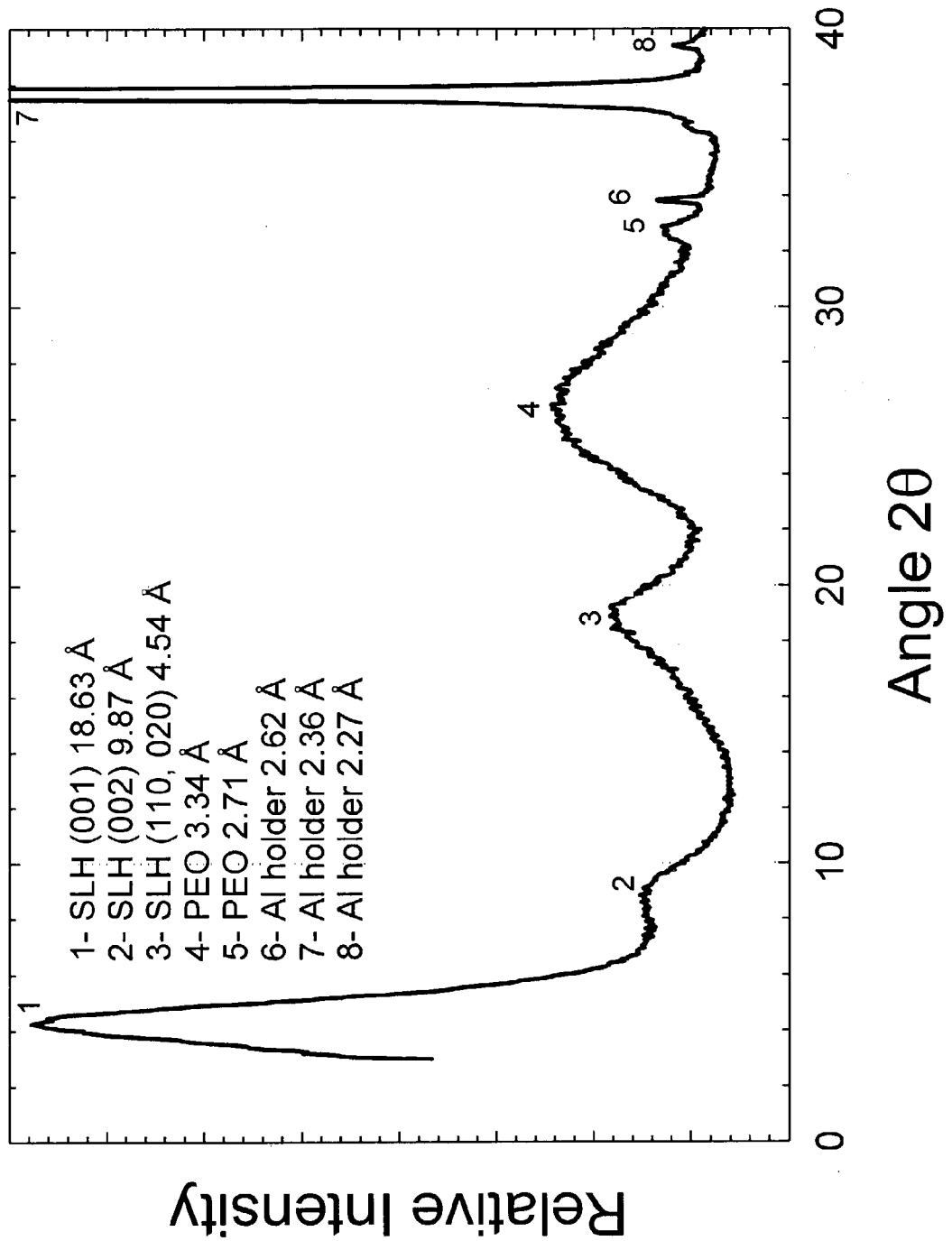
FIG. 5 is an x-ray powder diffraction pattern of a film containing polyethylene oxide and synthetic lithium smectite in a 1:1 mass ratio with the inset showing major diffraction peaks.

For comparison with SAXS data, X-ray powder diffraction of SLH and PEO powders were obtained. FIG. 3 shows the X-ray powder diffraction of the SLH powder. The peaks are indexed as indicated on the graph of FIG. 3. The distance between clay sheets is given by the $d_{001}$ reflection and corresponds to 12.7 Å, which includes one clay lattice unit at 9.6 Å. The gallery region therefore corresponds to 3.1 Å and contains Li(I) cations and water in this case. Because smectites are capable of swelling, this region can easily accommodate one or more layers of PEO (2). FIG. 4 shows the diffraction pattern of the PEO powder used to make the films. The peaks are quite sharp which indicates the crystalline nature of the starting material. An XRD pattern of a film containing PEO/SLH 1:1 ratio is shown in FIG. 5. The $d_{001}$ reflection has increased by 5.89 Å, indicating that the PEO has been intercalated within the clay galleries.

Figure 6:
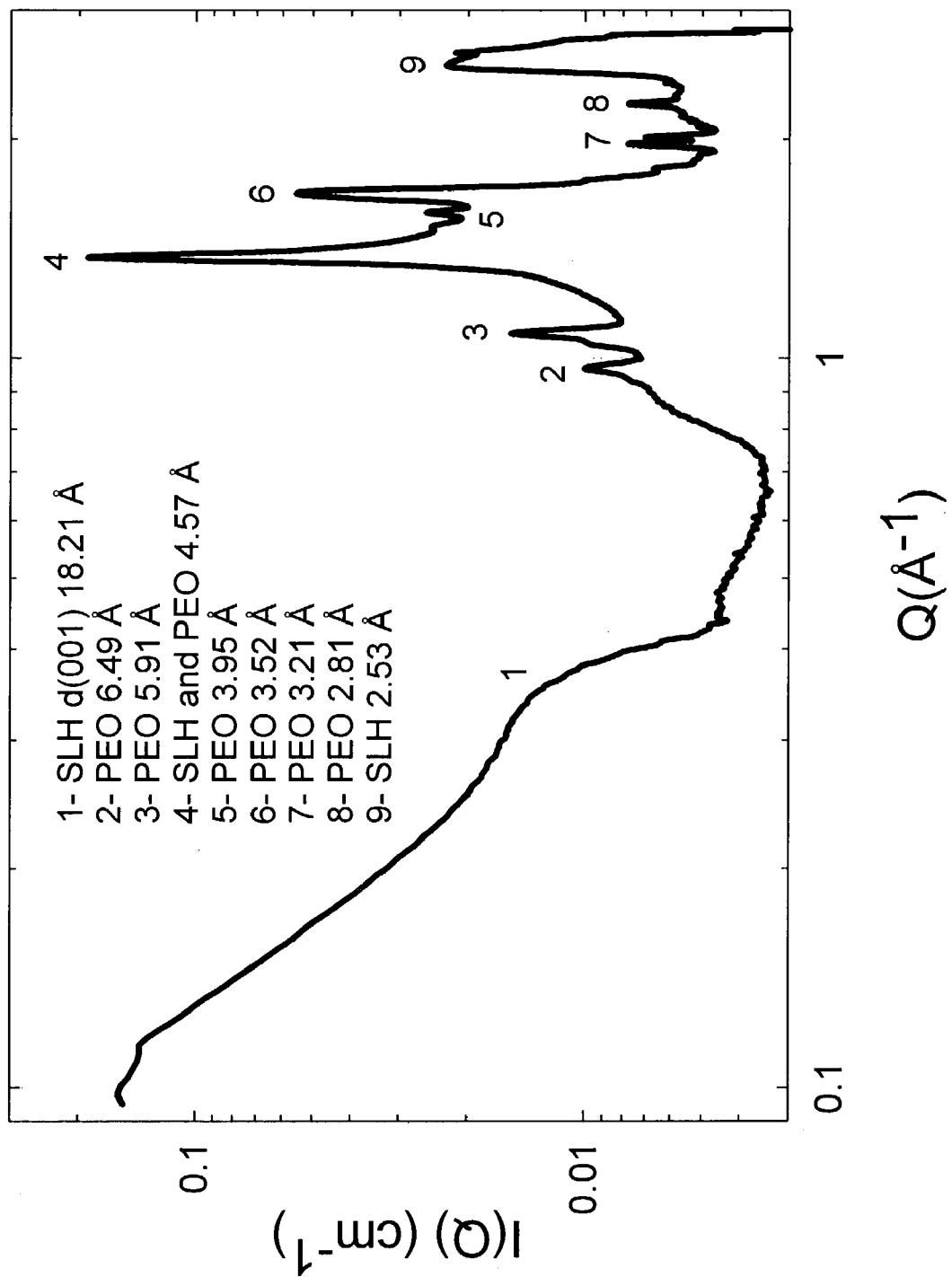
FIG. 6 is a SAXS of a PEO/SLH in a 1.2:1 mass ratio film at room temperature with the inset showing diffraction peaks attributed to PEO and SLH.
Figure 7:
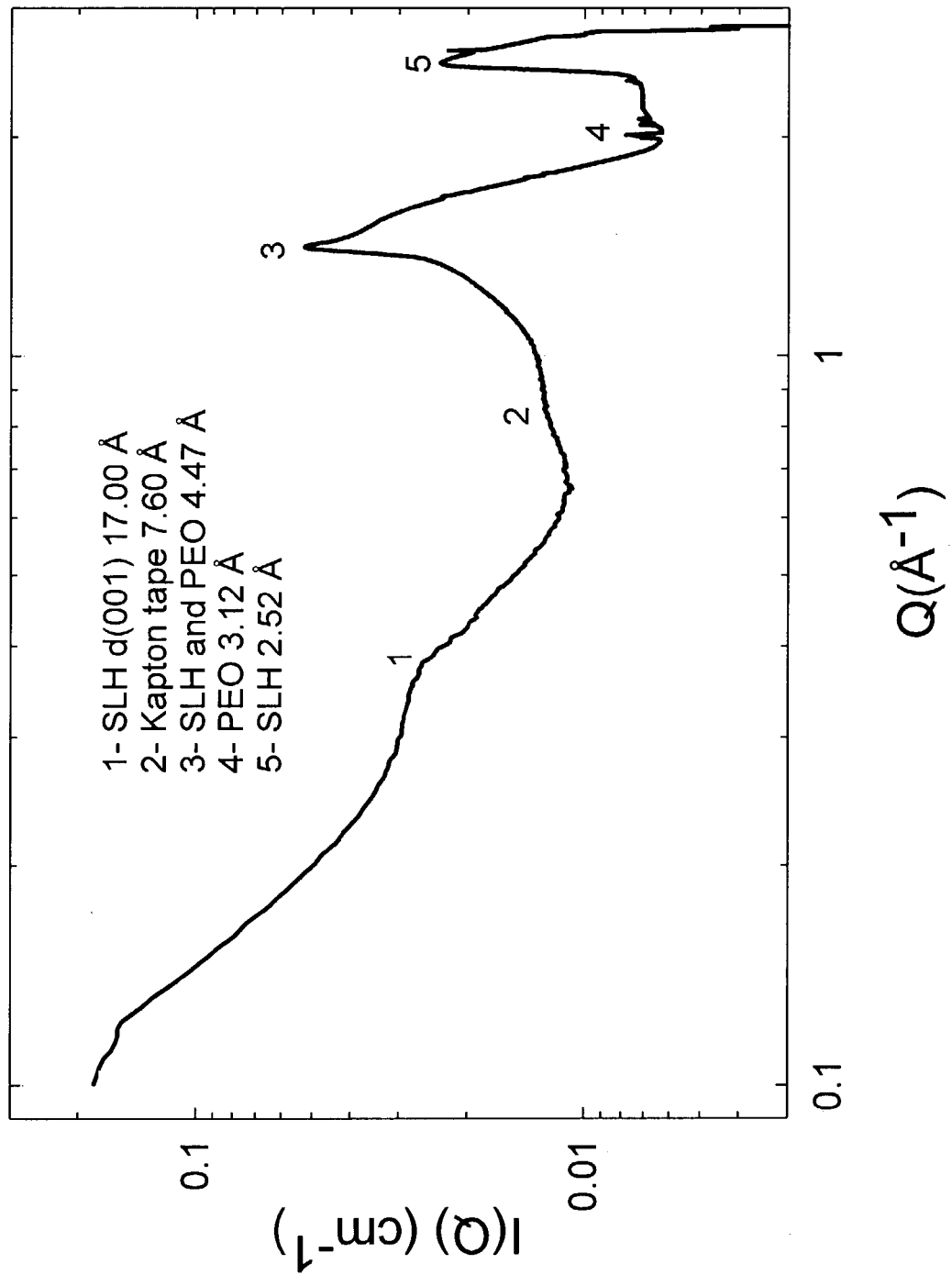
FIG. 7 is a SAXS of the material illustrated in FIG. 6 after heating to 60° C. under nitrogen at 5° C./min. showing the sharp peaks from PEO broadened indicating the PEO has lost its crystallinity.
Figure 8:
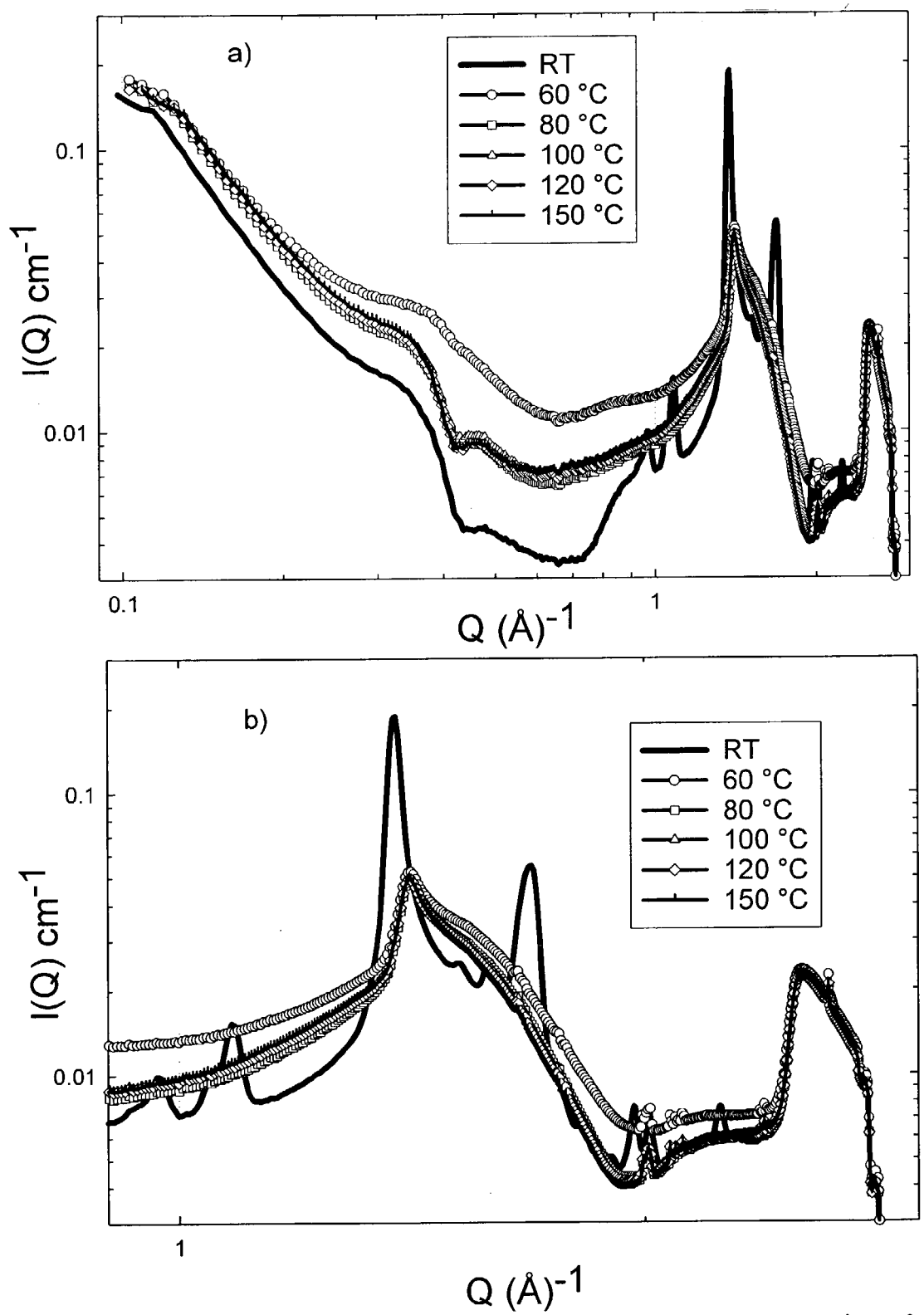
FIG. 8($a$) is a SAXS of the material in FIG. 7 heated to various temperatures and 8B is the same as FIG. 8($b$) with the x-axis expanded.

FIG. 6 shows SAXS data obtained from a film made of PEO/SLH 1.2:1 mass ratio. The data was collected at room temperature. FIG. 6 shows clearly the peaks that correspond to SLH and PEO. The $d_{001}$ peak is broader than presented in the XRD plots (because it is plotted here as Q in $Å^{-1}$), but the spacing differs only by 0.42 Å. SAXS data was then collected at 60° C. and the results are shown in FIG. 7. It is clear that the structure of the polymer has changed as indicated by the near complete disappearance of the PEO crystalline peaks. It is therefore believed that the polymer chains have relaxed inside the clay layers. Other evidence of such relaxation is the decrease in $d_{001}$ spacing, which indicates a more dense polymer phase. Under these circumstances, the polymer matrix is more mobile and the lithium ions associated with the polymer can have higher transference number, leading to a higher conductivity. The samples were also heated at 80, 100, 120, and 150° C. and the results are shown in FIGS. 8a) and b), wherein FIG. 8b is FIG. 8a with the x-axis expanded, the same as FIGS. 10(a)(b) and FIGS. 11(a)(b). Except for complete disappearance of the PEO peaks at 80° C., there are no other polymer structural changes. Due to the PEO content of these nanocomposites, it is possible that part of the polymer remains adsorbed at clay surface and that after heating the samples, this PEO can re-intercalate. After the samples were heated at 150° C., they were cooled down at room temperature and a SAXS measurement was performed. The results suggested that the lost of PEO crystallinity is irreversible, that is, no crystalline peaks were observed.

Figure 9:
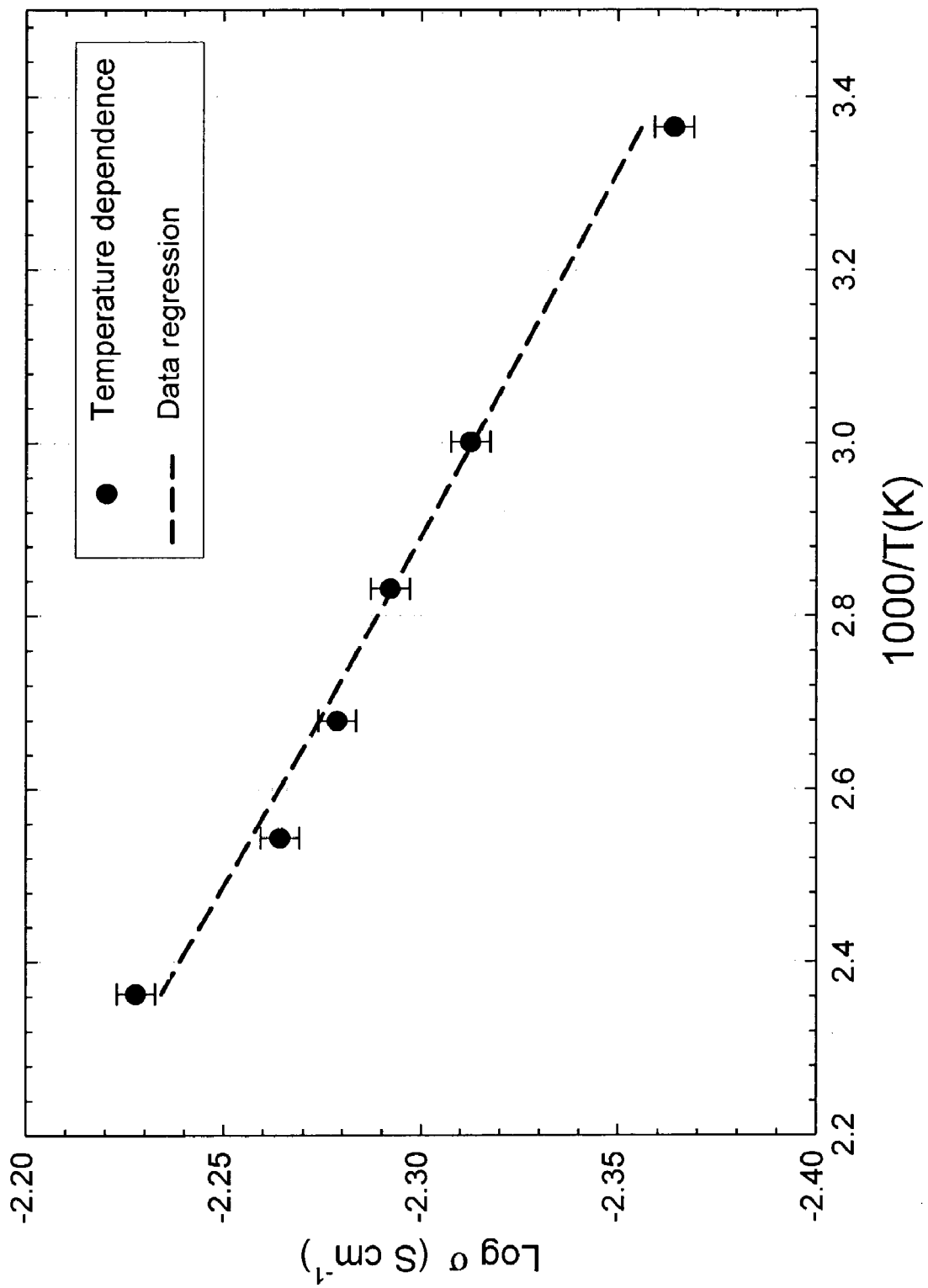
FIG. 9 is a plot of the conductivity of the sample as a function of temperature for a PEO/SLH 1:1 mass ratio.

The conductivity of the nanocomposite was determined at the same temperature as the SAXS in situ data to correlate the changes in the nanocomposite structure with conductivity. FIG. 9 shows a plot of conductivity as a function of temperature of the nanocomposite with nominal composition PEO/SLH 1:1 mass ratio. As known, the conductivity of the polymer nanocomposites increases as the sample is heated from room temperature (26.0° C.) to 150° C. As shown in the plot, the largest increase in conductivity occurs between room temperature and 60° C., in accordance with the decrease on the polymer crystallinity. Similar behavior was observed for the PEO/SLH 0.6:1, 0.8:1, and 1.2:1 samples.

Transference numbers were obtained following the procedures outlined by Dees et al. in Chen, H. W.; Chiu, C. Y.; Chang, F. C. *J. Polym. Sci., Part B, Polm. Phys.* 2002, 40, 1342. As anticipated for a single ion conductor, the transference numbers obtained as a function of temperature were very close to unity (Table 1). Same as with the conductivity values, the largest increase in the numbers is observed from room temperature to 60° C., in accordance to the conductivity values and the loss of polymer's crystallinity.

Figure 10:
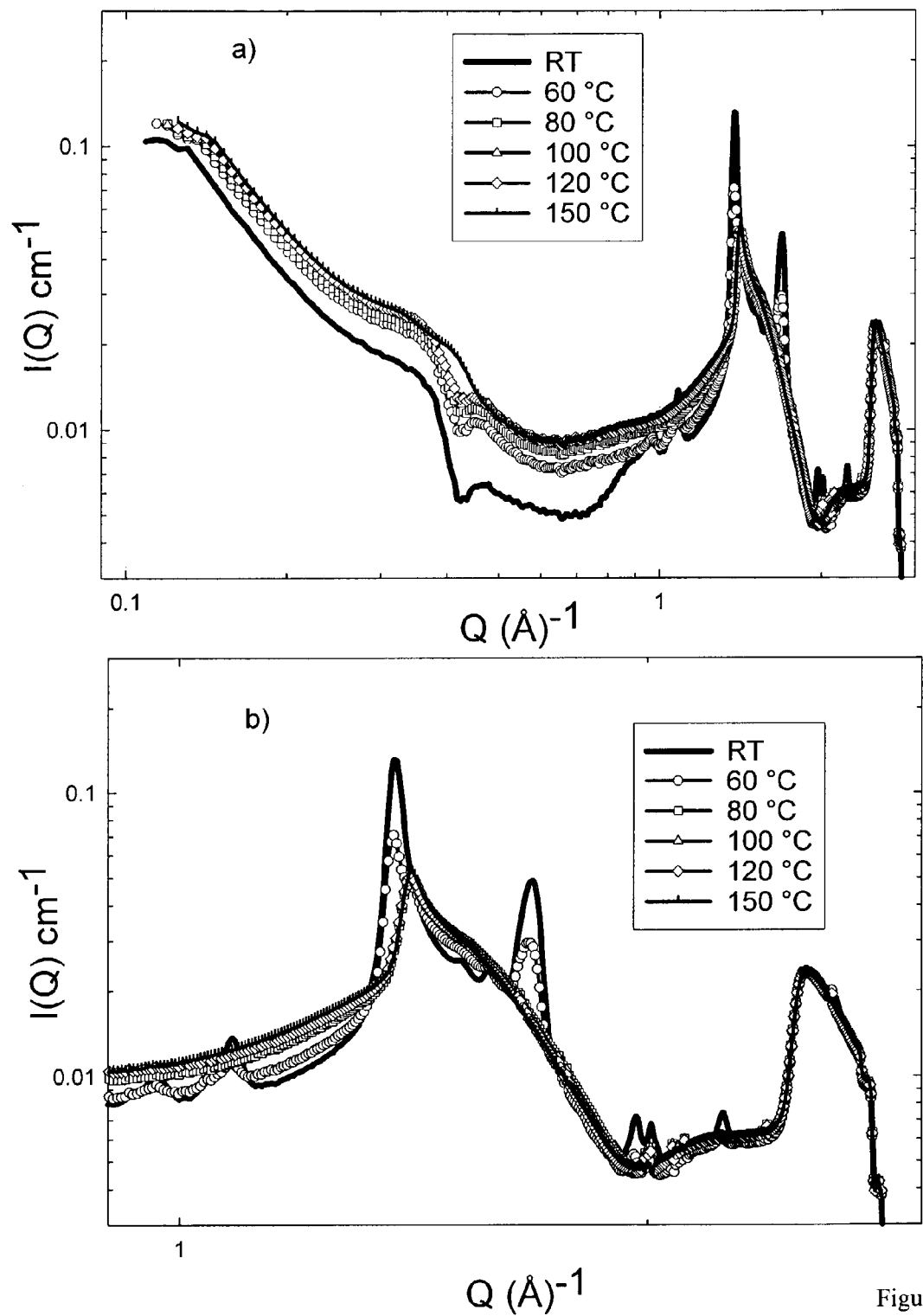
FIG. 10($a$) is a SAXS of a PEO/SLH 0.8:1 mass ratio film at various temperatures and FIG. 10($b$) is the same as FIG. 10($a$) with the x-axis expanded.

In situ studies were also performed on the nanocomposites samples with ratios of 0.6, 0.8, and 1.0 g of PEO/g of clay. The results of the 0.8 g PEO/SLH are shown in FIGS. 10(a) and 10(b). The changes are identical to the other films (results of the 1:1 and 0.6 not shown). The only difference resides on the intensity of the PEO peak at 4.47 Å, which decreases slightly as the amount of PEO in the film decreases.

Figure 11:
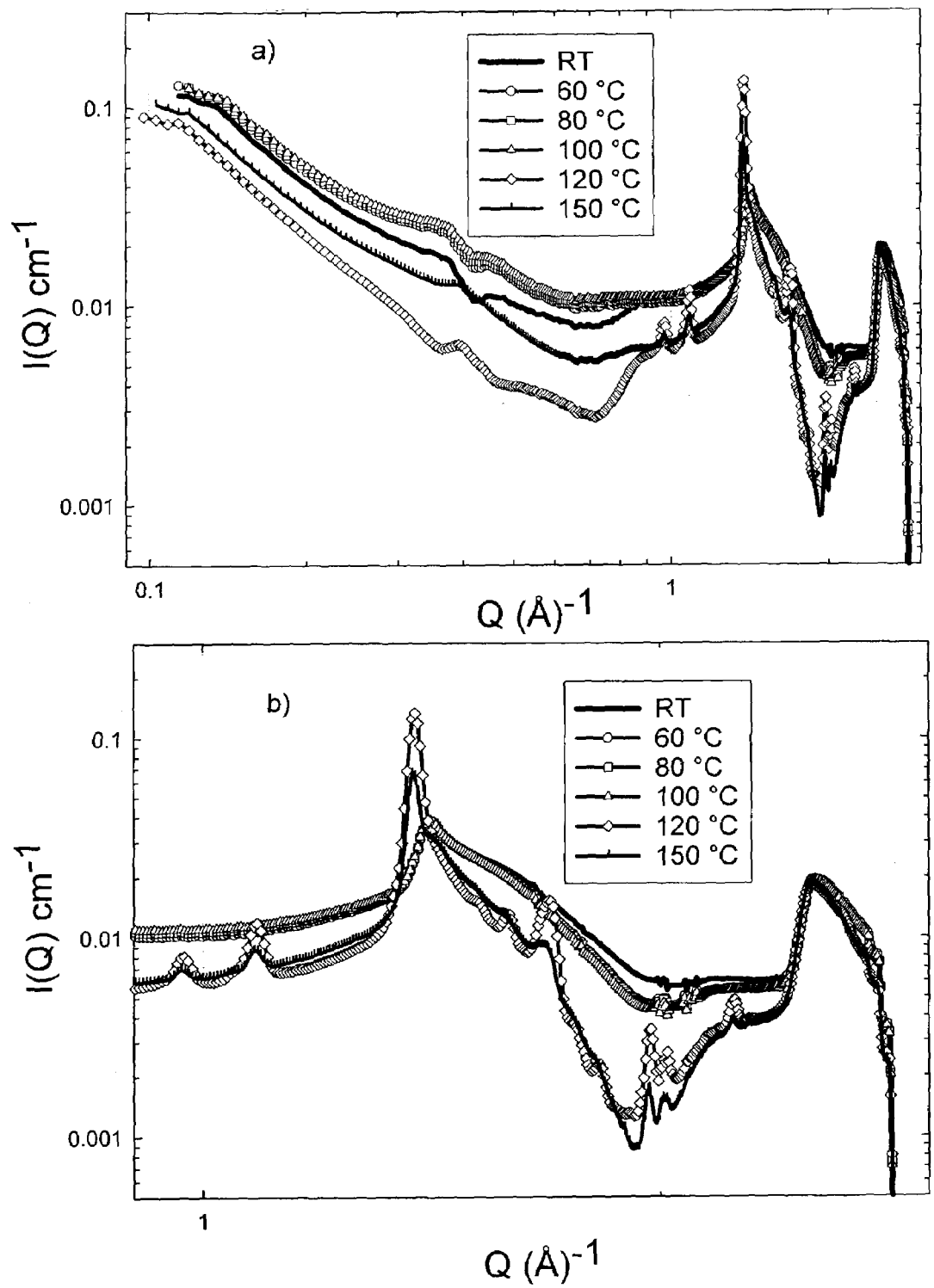
FIG. 11($a$) is a SAXS of a PEO/laponite film having a mass ratio of 1.2 to 1 while FIG. 11($b$) is the same as FIG. 11($a$) with the x-axis expanded.
Figure 12:
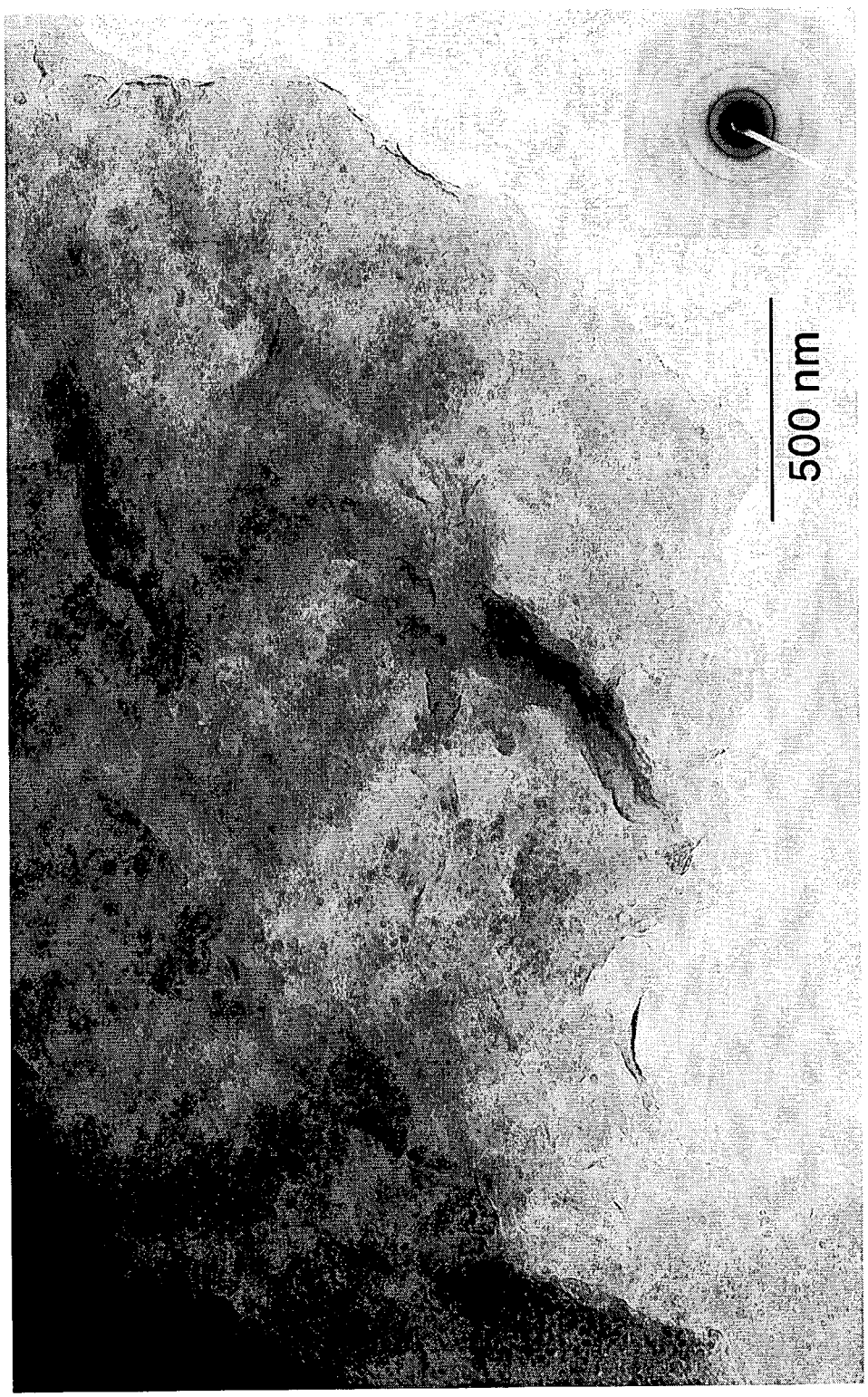
FIG. 12 shows the TEM of a 1:1 PEO/SLH mass ratio nanocomposite membrane with small 20 nanometer silica spheres visible throughout the background.

For comparative purposes, in situ SAXS studies were also performed on films made with PEO/laponite at different mass ratios. FIGS. 11(a) and 11(b) shows the data taken at different temperatures of a film made with a mass ratio of PEO/laponite of 1.2:1. The data is similar to the PEO/SLH; however, the conductivity of the PEO/SLH films is at least one order of magnitude higher (at 60° C.) than the films made of PEO/laponite. The SLH has larger particle size than laponite and about 20% silica impurity and either of which may be responsible for the higher conductivity. FIG. 12 shows the TEM of a 1:1 PEO/SLH membrane, wherein small 20 nm disks due to silica spheres are visible throughout the background. Commercially available laponite does not contain silica particles. Other clay materials contain negligible amounts of silica impurities. For example, when Li-fluorohectorite is made by high temperature solid-state melting process, it does not contain any silica. SAz-1 montmorillonite has at most only about 1% quartz and similarly small amounts of cristobalite or opal as the only silica impurities. Swy-2 is about 95% clay when purified and 4% of the impurities are quartz. Most montmorillonites are fairly pure and do not have much silica. The synthetic route disclosed herein leads to the production of polymeric nanocomposites with enhanced conductivity without addition of ceramic or oxide fillers.

In situ SAXS studies show that the structural changes, as a function of temperature, of polymer nanocomposites derived from PEO/SLH, can be obtained with detail. At 60° C., PEO losses its crystallinity and it is at this point where the films become more conductive, as also indicated by the high conductivity ($4.87 \times 10^{-3}$ S/cm) and the almost unity transference number (0.95). It has been indicated that high crystallinity in polymers is unfavorable for ionic conductivity. When the polymer phase becomes amorphous, there is an increase of the disordered regions responsible for the ion conduction. There are no other structural changes upon heating the films to 150° C., indicating the stability of the nanocomposites.

Referring now to Table 1, the transference numbers for a variety of different PEO/SLH mass ratio membranes as a functional temperature is reported. As seen from the left hand column of Table 1, the mass ratio of the polyethylene oxide (ether) to the synthetic hectorite was varied from 06:1 to 1.2:1. The transference numbers for each of the various membranes were reported from room temperature (RT), all the way to 150° C. As may be seen from the Table, the transference numbers as high as 0.95 were obtained for certain membranes at temperatures ranging from 60°–100° C. while transference numbers in general above 0.90 were reported for a variety of membranes. This Table shows the superior nature of the single ion-conducting electrolytes of the present invention. Transference numbers approaching unity have been obtained under a variety of conditions and these numbers are a distinct improvement over dual ion-conducting polymer electrolytes known at the present time.

It is seen that there has been disclosed a single ion-conducting material of a composite of a substantially amorphous polyethylene ether and a negatively charged synthetic smectite clay. More particularly, we have disclosed herein single ion-conducting membranes having thicknesses less than about 60 micrometers comprised of synthetic clay platelets less than 40 nanometers in thickness. In general, the material of the present invention has superior conductivity properties, in part, due to the excess silicon dioxide present in the synthetic smectite clay made in accordance with the method of the present invention. More particularly, the excess $SiO_2$ is present in an amount not less than about 15% by weight and generally in an amount from between about 15% and 25% by weight in excess of the stoichiometric amount of silicon dioxide required.

The single ion-conducting material of the present invention has characteristics which may be varied according to the molecular weight of the polyethylene ether or in the specific case illustrated, polyethylene oxide. Molecular weights in the range of from about 80,000 to about 250,000 have been found to be useful with molecular weights generally in the range of about 80,000 to about 100,000 range being preferred. In certain instances, mixtures of various molecular weight polyethylene oxides have been used such as 80% by weight having a molecular weight of about 80,000 and 20% by weight having a molecular weight of about 10,000, an improvement because the combination lowers the Tg of the material. The invention is intended to cover polyethylene oxides or ethers having a variety of different molecular weights.

Mass ratios of the polyethylene ether to the clay has been found to be effective in the range of from about 0.5:1 to about 3:1. Preferably, the ratio is about 1.5:1 and most preferably 1.2:1. In general, the single ion-conducting material is cation conducting and more particularly, the invention involves an alkali metal ion and most specifically lithium metal ion. Generally, the negatively charged smectite clay is a phyllosilicate and more particularly is a hectorite. Within the preferred embodiment the hectorite is a lithium hectorite. As stated before, the polyethylene oxide is intercalated between layers of the synthetic clay. Membranes made with the inventive material have thicknesses less than about 6.0 micrometers and most preferably in the range of from about 40 to about 60 micrometers. The hectorite platelets themselves have a thickness of less than about 40 nanometers and most preferably in the range of from about 15 to about 40 nanometers. As before stated, it is preferred that the ion transport number is greater than 0.9 and most preferably about 0.95.

A variety of substrates may be used to carry the membranes of the present invention. In general, the preferred substrates are either silicon or glass. Membranes of the present invention have been subjected up to about 20,000 psi without rupture. As is known in the art, there is a trade off or compromise between conductivity and mechanical strength. The thicker the membrane the stronger but less conductive. In general thicknesses in the range of 40–60 micrometers is preferred. One advantage of using mixtures of various molecular weight ethers is that the $T_g$ can be lowered by as much as 2–3° C. if up to about 20% polyethylene oxide of about 10,000 molecular weight is mixed with about 80% molecular weight polyethylene oxide of between about 80–100,000.

As seen from the foregoing, excess silicon dioxide in the amount of about 20% is preferred, see FIG. 2. The amount of $SiO_2$ is controlled by the method as disclosed in the previously cited Carrado '808 patent. In general, excess silicon dioxide in the range of from about 15 to about 25% is preferred.

TABLE 1

Transference numbers obtained for different PEO/SLH mass ratio as a function of temperature.

| Composition | Temperature, ° C. | | | | | |
|---|---|---|---|---|---|---|
| PEO/SLH | RT | 60 | 80 | 100 | 120 | 150 |
| | $t_{Li+}$ | | | | | |
| 0.6:1 | 0.88 | 0.92 | 0.92 | 0.93 | 0.93 | 0.93 |
| 0.8:1 | 0.90 | 0.95 | 0.95 | 0.95 | 0.94 | 0.94 |
| 1:1 | 0.87 | 0.91 | 0.92 | 0.93 | 0.93 | 0.93 |
| 1.2:1 | 0.87 | 0.90 | 0.90 | 0.91 | 0.91 | 0.92 |

Figure 13:
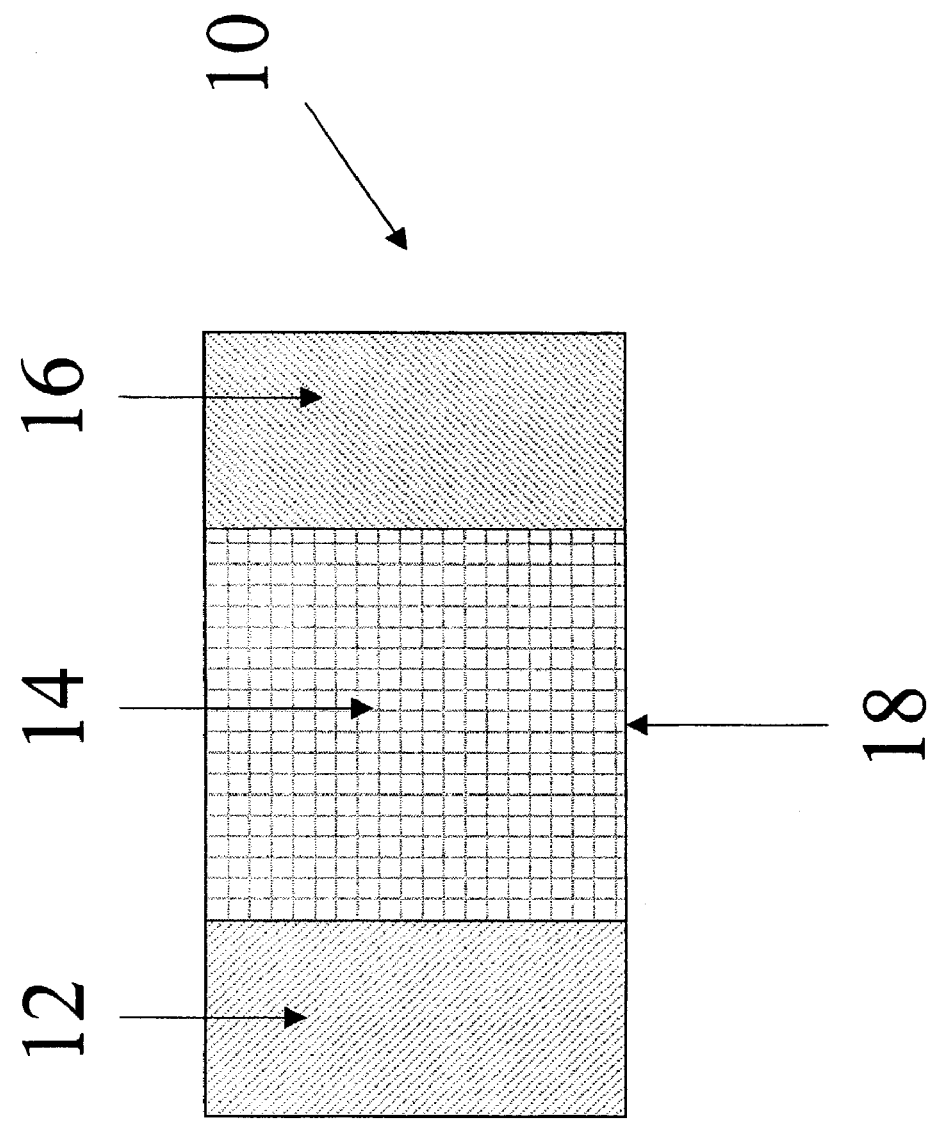
FIG. 13 is a schematic representation of a cell or battery incorporating the inventive electrolyte.

Referring to FIG. 13, there is illustrated a battery for lithium ion-secondary cells and batteries consisting of several cells. As shown schematically in FIG. 13, the cell 10 has a negative electrode 12 separated from a positive electrode 16 by an electrolyte 14, all contained in an insulating housing 18 with suitable terminals (not shown) being provided in electronic contact with the negative electrode 12 and the positive electrode 16. Binders and other materials normally associated with the electrolyte, the negative or positive electrodes are well known in the art and are not described herein, but are included as is understood by those of ordinary skill in this art. Cells 10 form batteries, as is well known, by connecting cells 10 in parallel and/or in series.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A single ion-conducting material, comprising a composite of a substantially amorphous polyethylene ether and a negatively charged synthetic smectite clay having silica spheres associated therewith.

2. The single ion-conducting material of claim 1, wherein said material is a membrane.

3. The single ion-conducting material of claim 2, wherein said membrane has a thickness less than about 60 micrometers.

4. The single ion-conducting material of claim 1 wherein said synthetic clay has platelets less than about 40 nanometers in thickness.

5. The single ion-conducting material of claim 1, wherein said silica spheres are present as excess $SiO_2$.

6. The single ion-conducting material of claim 5, wherein said excess $SiO_2$ is present in said synthetic smectite clay in an amount not less than about 15%.

7. The single ion-conducting material of claim 5, wherein said excess $SiO_2$ is present in said synthetic smectite clay in an amount in the range of from about 15% to about 25%.

8. The single ion-conducting material of claim 1, wherein at least a portion of said polyethylene ether has a molecular weight in the range of from about 80,000 to about 250,000.

9. The single ion-conducting material of claim 1, wherein the mass ratio of polyethylene ether to clay is in the range of from about 0.5:1 to about 3:1.

10. The single ion-conducting material of claim 1, wherein the single ion is a cation.

11. The single ion-conducting material of claim 10, wherein the single ion is an ion of an alkali metal.

12. The single ion-conducting material of claim 1, wherein said negatively charged synthetic smectite clay is a phyllosilicate.

13. The single ion-conducting material of claim 12, wherein said negatively charged synthetic smectite clay is a hectorite.

14. The single ion-conducting material of claim 13, wherein said hectorite is a lithium hectorite.

15. The single ion-conducting material of claim 14, wherein said lithium hectorite is a membrane having a thickness in the range of from about 40 to about 60 micrometers and wherein said lithium hectorite has platelets having a thickness in the range of from about 15 to about 40 nanometers.

16. The single ion-conducting membrane of claim 15, wherein the ion transport number is greater than 0.90.

17. The single ion-conducting membrane of claim 16, wherein the ion transport number is about 0.95.

18. The single ion-conducting membrane of claim 16, and further comprising a substrate carrying said membrane.

19. The single ion-conducting membrane of claim 18, wherein said substrate is silicon or a glass.

20. A single ion-conducting material, comprising a composite of a substantially amorphous polyethylene ether and a negatively charged synthetic smectite clay having silica spheres associated therewith, wherein said silica spheres are present in excess of the stoichiometric amount of silica required for said synthetic smectite clay and said material has an ion-transport number greater than about 0.9.

* * * * *